Jan. 12, 1943.  J. M. WALTER  2,307,975
HORIZONTAL BORING, DRILLING AND MILLING MACHINE
Filed March 21, 1942  3 Sheets-Sheet 1
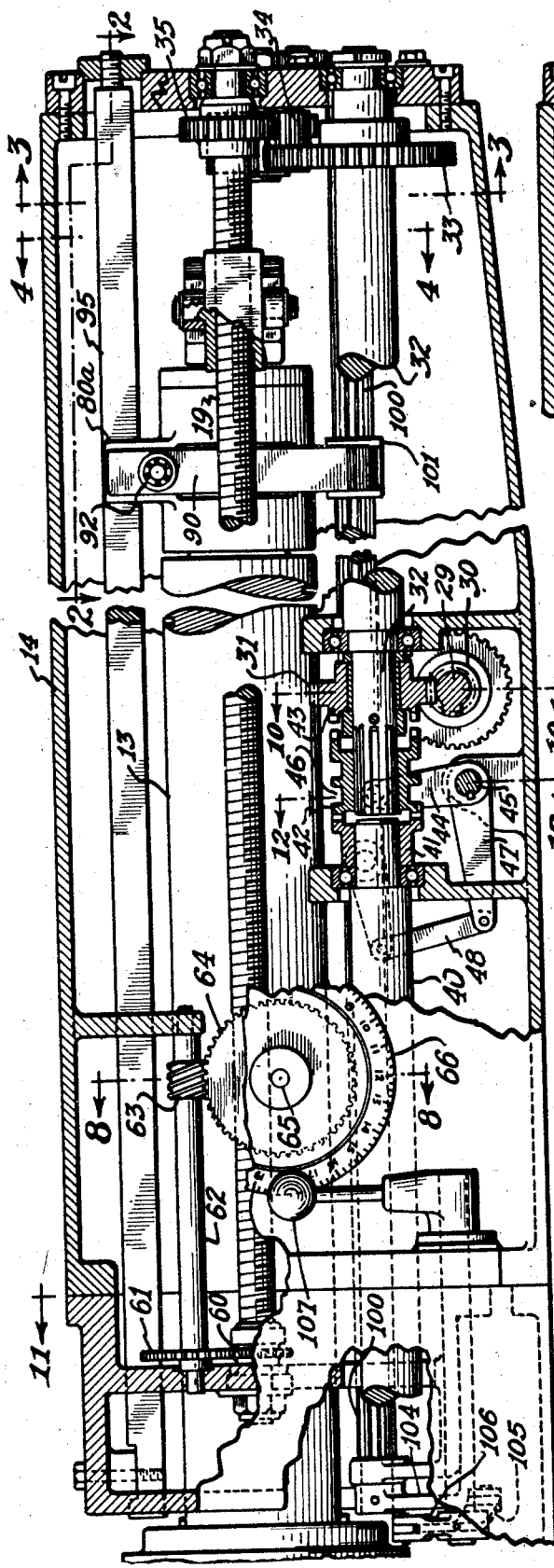
INVENTOR.
JOHN M. WALTER.
BY Allen & Allen
ATTORNEYS.

Jan. 12, 1943. J. M. WALTER 2,307,975
HORIZONTAL BORING, DRILLING AND MILLING MACHINE
Filed March 21, 1942 3 Sheets-Sheet 2

INVENTOR.
JOHN M. WALTER.
BY Allen & Allen
ATTORNEYS.

Jan. 12, 1943.   J. M. WALTER   2,307,975
HORIZONTAL BORING, DRILLING AND MILLING MACHINE
Filed March 21, 1942   3 Sheets-Sheet 3

INVENTOR.
JOHN M. WALTER.
BY
Allen & Allen
ATTORNEYS.

Patented Jan. 12, 1943

2,307,975

UNITED STATES PATENT OFFICE 2,307,975

HORIZONTAL BORING, DRILLING, AND MILLING MACHINE

John M. Walter, Cincinnati, Ohio, assignor to The G. A. Gray Company, Cincinnati, Ohio, a corporation of Ohio Application March 21, 1942, Serial No. 435,699

17 Claims. (Cl. 77—57)

This invention relates to what are known in the trade as horizontal boring, drilling and milling machines, and more particularly to the spindle feeds for such machines. While the invention is illustrated herein and described in connection with this particular type of machine, it will be clear from a study of the specifications that the invention is applicable to various types of machine tools having a spindle in which it is desired to feed the spindle axially.

Spindles in machine tools have heretofore been provided with feeding movement but, in all machines with which I am familiar, some sort of guide in the frame of the machine was required in order to accomplish the feed. In some of these feed mechanisms, the actual thrust, axially of the spindle, was along a line parallel to the spindle but removed from the axis of the spindle whereby a mechanical couple was set up which produced strains in the frame and feed mechanism. In other mechanisms where a single screw was employed, the screw being coaxial with the spindle, it was necessary to provide a guide in the frame of the machine to restrain the nut, which engaged the screw, against rotation, thus setting up a torque couple with resultant binding. In mechanisms of the type described, accurate machining and alignment of the guiding surfaces is essential for efficient and satisfactory operation. Numerous attempts have been made to overcome the difficulties mentioned above, but so far as I am aware, all such attempts have been quite complicated and have not been highly successful.

With the above considerations in mind, it is an object of my invention to provide a feed mechanism in which the feed pressure or thrust is applied substantially axially of the spindle without the aid of the usual secondary member guided in the frame of the machine.

It is a further object of my invention to provide means for locking the spindle against axial movement when it is desired that the spindle not have feed movement during the cutting operation.

It is another object of my invention to provide a mechanism as outlined above which is relatively simple and cannot get out of adjustment, which will be inexpensive to manufacture and which can be assembled as a unit to be applied to the spindle carrying head without necessitating accurate alignment therewith so as to avoid binding of the spindle when said spindle is moved axially.

These and other objects of my invention which will be described more in detail hereinafter or which will be apparent to one skilled in the art upon reading these specifications, I accomplish by that certain construction and arrangement of parts of which I shall now describe an exemplary embodiment.

Reference is made to the drawings forming a part hereof and in which:

Figure 1 is a front elevation with parts broken away to show the inner construction and with parts in cross-section of the spindle housing.

Figure 2 is a cross-sectional view of the same taken on the line 2—2 of Figure 1.

Figure 3 is a cross-sectional view taken on the line 3—3 of Figure 1.

Figure 9:
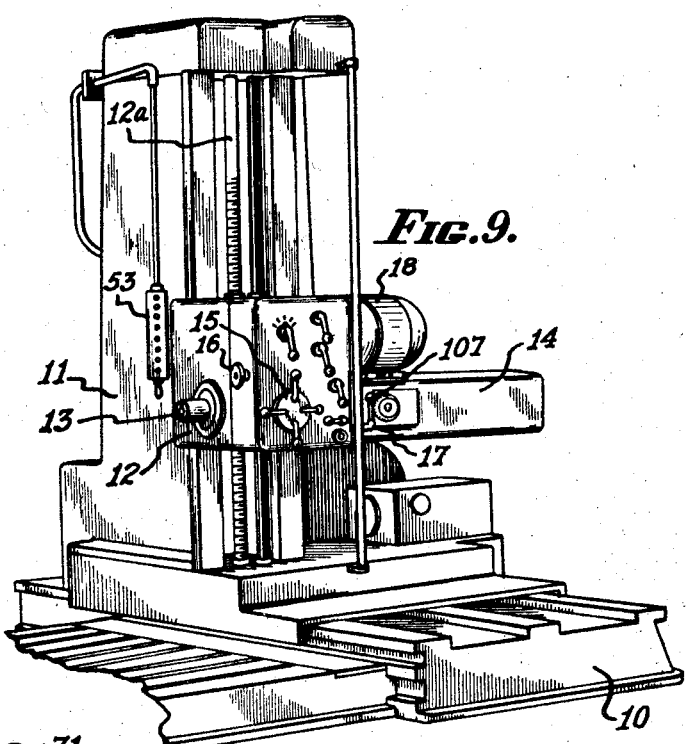
Figure 9 is a perspective view of the complete machine.
Figure 8:
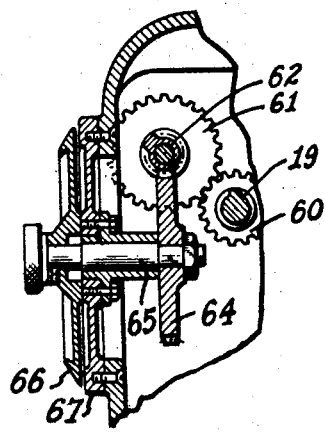
Figure 8 is a fragmentary cross-sectional view taken on the line 8—8 of Figure 1.

Referring first to Figure 9, I have shown a machine tool of the type to which my invention may be applied, that is, a horizontal floor type boring, drilling and milling machine. This machine has a runway 10 upon which is mounted a column 11, and a head 12 is arranged for vertical movement on the column by means of a lead screw 12a cooperating with a nut inside the head 12. The spindle 13 is carried in the head and extends into a housing 14. Various handles and levers are provided on the head 12 to control speed of rotation of the spindle as well as a turnstile for manually traversing the spindle rapidly in either direction. The turnstile is indicated at 15 and two of the opposed hand members of the turnstile 15 may be pulled outwardly to engage the power feed or pushed inwardly to disengage the power feed when it is desired to traverse the spindle manually. There is also provided at 16 a hand wheel for manual fine feeding of the spindle. The lever indicated at 17 permits locking of the spindle axially by means of a mechanism which will be described hereinafter. The spindle derives its power from the motor 18 through a gearing system which is described in Patent No. 2,215,627 in the name of John M. Walter. Since the gearing contained within the head 12 is fully described in said patent, I will not describe it further herein.

Figure 10:
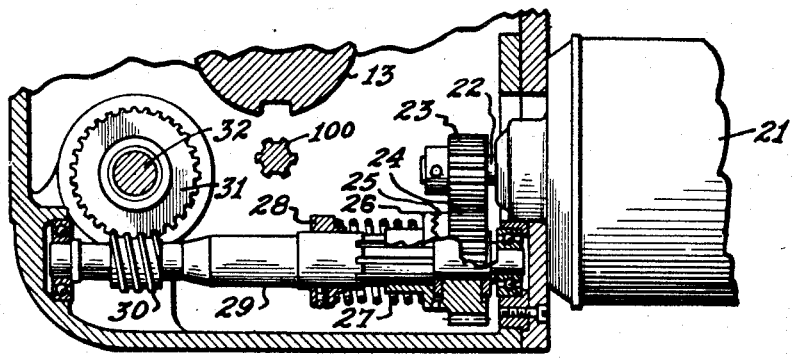
Figure 10 is a fragmentary cross-sectional view taken on the line 10—10 of Figure 1.

Referring now to Figure 1, the spindle is again shown at 13. The spindle is driven from the motor 18, as described in the above mentioned Letters Patent, and this drive is not shown in Figure 1; actually it comes into the spindle to the left of Figure 1. Mounted in suitable bearings in the housing 14 are a pair of lead screws 19 and 20. In order to balance any torque created by these lead screws, they are preferably made with the threads of opposite hands, i. e., one with right hand threads and the other with left hand threads and they are driven in opposite directions. It will be clear that nuts on these lead screws will travel in the same direction when the two lead screws are rotated in opposite directions. When power rapid traversing the spindle these screws are driven from a motor 21 mounted on the back of the spindle housing, in the following manner: Referring first to Figure 10, rotation of the motor shaft 22 is transmitted through gears 23 and 24 to one element 25 of a slip clutch having teeth, both sides of which have the same slope. A similar element 26 is engaged with the member 25 in a yielding manner by virtue of the spring 27 bearing at one end against the member 26 and at the other end against a sleeve 28 fixed to the shaft 29. It will be clear from Figure 10 that the portion of the shaft 29 which carries the member 26 is splined. From the construction just explained, it will be clear that the member 26 may yield to avoid damage to the mechanism in case too great a strain is put on the clutch. The shaft 29 carries a worm 30 meshing with a worm wheel 31 mounted upon a shaft 32. Referring now to Figures 1 and 3, the shaft 32 carries a gear 33 which meshes with a gear 34; and the gear 34 drives a gear 35 fixed to the lead screw 19, and the gear 34 also drives a gear 36 fixed to the lead screw 20 through an intermediate gear 37, the gear 37 serving only to reverse the direction of rotation of the lead screw 20 with respect to the lead screw 19. Hand traversing of the spindle, i. e., rotation of the lead screws 19 and 20 is accomplished by means of the turnstile 15 which through gearing, not shown, produces rotation of the shaft 40. Shaft 40 is also driven by the hand wheel 16 when the spindle is fed manually. For feeding the spindle by power the shaft 40 is driven at variable speeds by gearing not shown in the drawings, since this part of the feed drive is well known in the art and does not constitute a part of this invention. The shaft 40 carries a clutch member 41 which is adapted to mesh with a clutch member 42 which is splined on to the end of the shaft 32. It will be clear that when the clutch is in the position shown in Figure 1, the spindle may be traversed by hand, or fed by hand or power, whereas, if the clutch is shifted to the right so that the member 42 engages the clutch element 43, the spindle may be power rapid traversed.

Figures 12, 13:
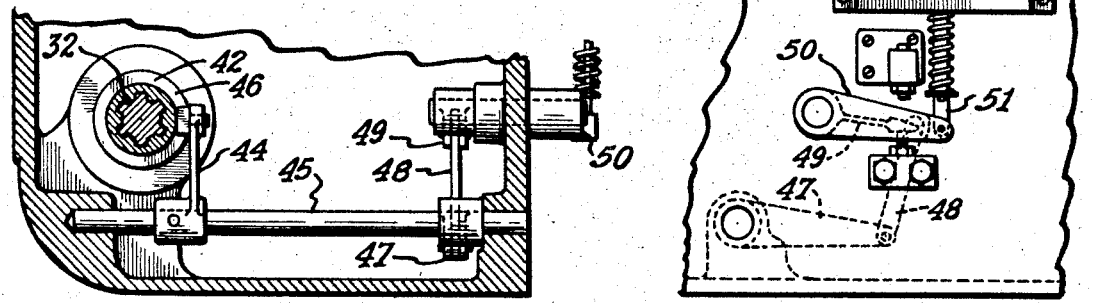
Figure 12 is a fragmentary cross-sectional view taken on the line 12—12 of Figure 1.
Figure 13 is a fragmentary elevational view of the rear of the spindle housing showing the portion approximately at the center of Figure 1 as seen from the rear.

The shifting of the clutch element 42 is accomplished as best seen in Figures 12 and 13 in connection with Figure 1. A shifter arm 44 is keyed on a shaft 45 and engages in a shifter groove 46 in the clutch element 42. At the other end of the shaft 45 is keyed a lever 47 which is connected by means of a linkage 48, 49, 50, to the plunger 51 of a solenoid 52. The solenoid 52 is electrically connected to the pendent switch 53, shown in Figure 9, so that when the appropriate button on the pendent switch 53 is pressed, the solenoid 52 is energized and through the linkage, just described, causes the clutch member 42 to shift to the right and thereby engage the clutch element 43 and disconnecting the clutch element 42 from the clutch element 41. At this time by means, not shown, a circuit is also completed to the power traverse motor 21 so that the spindle will be power traversed and the turnstile 15 and hand wheel 16 will not rotate. When the spindle is power rapid traversed it is essential that the turnstile 15 does not rotate since such rotation might injure the operator.

From the above it will be apparent that to power rapid traverse the spindle it is only necessary to press a button, the clutching and declutching being done by the solenoid 52. Two push buttons are provided on the pendent station 53 for power rapid traversing the spindle, one for traversing to the right and one for traversing to the left.

Since the rotation of the lead screws is proportionate to the feeding movement of the spindle, means are provided for indicating the amount of spindle feed as shown in Figures 1 and 3. The lead screw 19 is provided with a gear 60 which meshes with a gear 61 on a short shaft 62. Also mounted on the short shaft 62 is a worm 63 which engages a worm wheel 64 mounted on a stub shaft 65. The shaft 65 extends through a wall of the casing 67 and carries a graduated dial 66. The dial is appropriately graduated to indicate the amount of feed of the spindle as will be clear.

Figure 4:
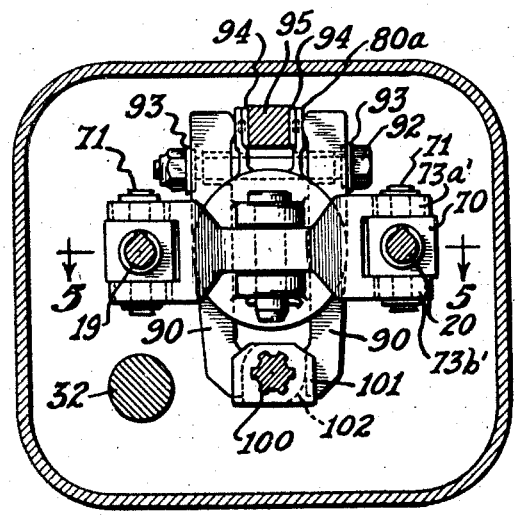
Figure 4 is a cross-sectional view taken on the line 4—4 of Figure 1.

Coming now to a description of the connection between the lead screws 19 and 20 and the spindle, reference is had particularly to Figures 1, 2, 4, 5 and 6. Each of the lead screws 19 and 20 carries a nut shown in detail in Figure 6, one of the nuts having a right hand thread and one having a left hand thread to cooperate respectively with lead screws 19 and 20. These nuts will be indicated by the reference numeral 70 although they differ in respect to the direction of their internal threads. As will be clear from Figure 6, each nut is provided with trunnions 71 extending from opposed faces thereof. Rectangular blocks having bores to fit the trunnions 71 are pivotally mounted on the trunnions 71 as indicated at 72. The blocks 72 are engaged by forks 73 of the cross member 74. The cross member 74, as will be clear from consideration of Figures 2 and 4, is forked in two directions at right angles to each other so that upper and lower forks 73a and 73b (Figure 4) engage above and below the nuts 70, while arms 73a' and 73a'' engage on two sides of the blocks 72 on one side of the nut and arms 73b' and 73b'' similarly engage below the nut 70. From the foregoing description, it will be clear that the lead screws 19 and 20 do not need to be perfectly aligned with the spindle nor do the leads of the two screws have to be perfectly alike since the connection between the cross member 74 and the respective nuts 70 is such as to permit movement in all necessary directions.

Figure 5:
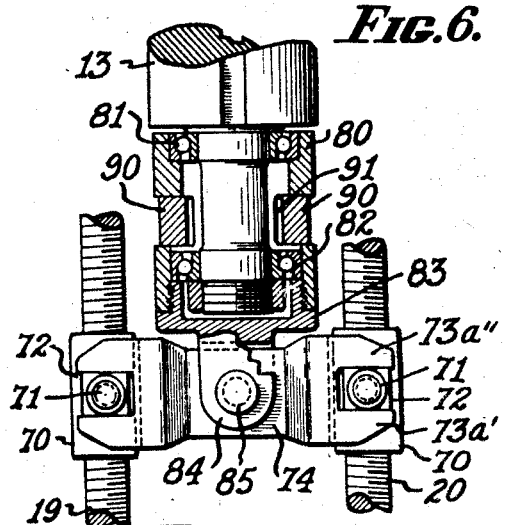
Figure 5 is a fragmentary cross-sectional view taken on the line 5—5 of Figure 4.

As shown in Figure 5, the end of the spindle 13 is reduced and has bearings in a sleeve 80. These bearings, indicated at 81 and 82, are of the thrust type and permit of free rotation of the spindle 13 in the sleeve 80. A cap element 83 is threaded onto the sleeve 80 and has a pair of ears 84 which embrace the central portion of the cross member 74 pivotally by means of a pin 85. Cross member 74 does not fit snugly between the ears 84 of cap 83 as can be seen in Figure 4. Clearance is provided between the cross member and the ears so that binding will not result if the lead screws 19 and 20 are out of alignment vertically, with the spindle. It will thus be clear that as the nuts 70 travel along the lead screws 19 and 20 they carry with them the cross member 74 and thus, the sleeve 80 and spindle 13.

Figure 7:
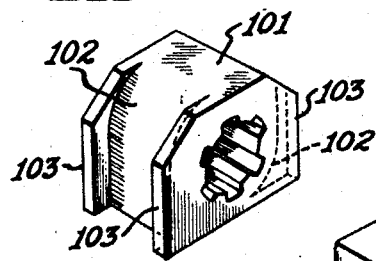
Figure 7 is a detail perspective view of a cam member used in connection with the clamping arrangement.
Figure 6:
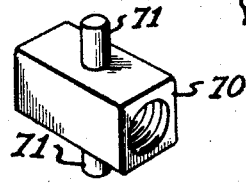
Figure 6 is a detail perspective of one of the nuts which engage the lead screws.
Figure 11:
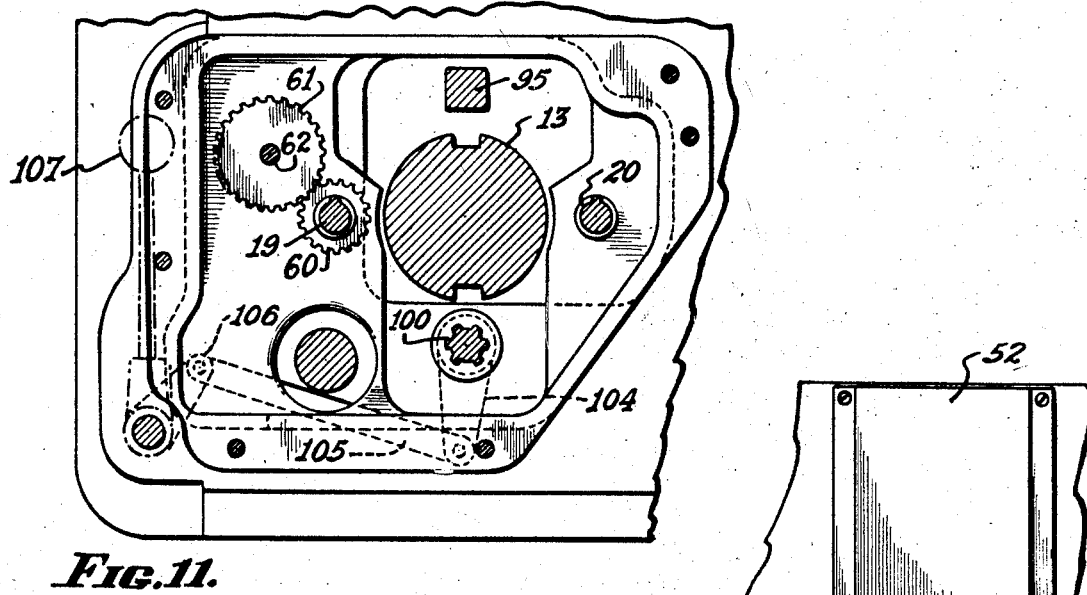
Figure 11 is a cross-sectional view taken on the line 11—11 of Figure 1.

Means are provided for fixedly clamping the spindle against axial movement and these means comprise a pair of clamping elements 90 (Figures 4 and 5) which engage in grooves 91 in the sleeve 80. Adjacent their upper ends, the clamping elements 90 are held together by means of a nut and bolt as indicated generally at 92 and the washers 93, riding in depressions in the member 90 serve as fulcrums for the clamping members. The upper ends of the clamping members 90 embrace a pair of jaws 80a formed on the sleeve 80. The jaws have soft metal faces 94 which are arranged to engage the clamping bar 95 which extends through the spindle housing parallel to the spindle and it will be clear that if the lower ends of the members 90 are spread apart using the washers 93 as fulcrums, a clamping action will be exerted upon the bar 95 and by virtue of the cooperation of the members 90 in the groove 91 of the sleeve 80, the spindle will be fixed against axial movement. Below the spindle is provided a splined shaft 100 and a cam element 101 is arranged for sliding movement upon the spline shaft. The member 101 is shown in detail in Figure 7 and it will be observed that it is provided with cam surfaces 102. The lower ends of the members 90 bear on the cam surfaces 102 and fit between the flanges 103. If now the cam element 101 is rotated counterclockwise, as seen in Figure 4, the clamping action above described ensues. The splined shaft 100 is rotated as shown in Figure 11, by means of a linkage 104, 105, 106 and the handle 107, which handle may be seen in Figure 9 and it will be clear that upon movement of the handle 107, through the linkage described, the splined shaft and cam element, no matter where it is positioned axially of the splined shaft, will be rocked causing the members 90 to spread and exert clamping action by means of the jaws 80a against the bar 95.

While I have described my invention in considerable detail, it will be clear that numerous modifications may be made without departing from the spirit of my invention, which modifications would only involve the knowledge of a man skilled in machine tool design. Therefore, it is to be understood that the description herein is a non-limiting example and that I do not intend to limit myself otherwise than as pointed out in the claims which follow.

Having thus fully described my invention, what I claim as new and desire to secure by Letters Patent is:

1. In a machine of the class described, a spindle, means for rotating said spindle at a desired speed, and means for feeding said spindle axially, said means comprising a pair of lead screws on diametrically opposed sides of said spindle, nuts on said lead screws and an element connecting said nuts and arranged to bear substantially at its center against said spindle for feeding the same.

2. In a machine of the class described, a spindle, means for rotating said spindle at a desired speed and means for feeding said spindle axially, said means comprising a pair of lead screws on diametrically opposed sides of said spindle, nuts on said lead screws, said lead screws having threads of opposite hands whereby the torque reaction is neutralized on the nuts, and an element connecting said nuts and arranged to bear substantially at its center against said spindle for feeding the same.

3. In a machine of the class described, a spindle, means for rotating said spindle at a desired speed and means for feeding said spindle axially, said means comprising a pair of lead screws on diametrically opposed sides of said spindle, nuts on said lead screws, said lead screws having threads of opposite hands whereby the torque reaction on the nuts is neutralized, means for causing rotation of said lead screws in opposite directions, and an element extending between said lead screws and pivotally connected to said nuts and a thrust bearing on the end of said element substantially the center thereof, whereby slight variations in alignment of said lead screws with respect to the spindle will not cause binding, and whereby the thrust is transmitted to said spindle along the axis thereof.

4. In a machine of a class described, a spindle, means for rotating said spindle at a desired speed and means for feeding said spindle axially, said means comprising a pair of lead screws on diametrically opposed sides of said spindle, nuts on said lead screws, said lead screws having threads of opposite hands whereby their torque reaction on the nuts is neutralized, manual means for rotating said lead sorews in opposite directions, power means for rotating said lead screws in opposite directions, an element extending between said lead screws and pivotally and slidably connected to said nuts, a thrust bearing on the end of said spindle, a pivotal connection between said thrust bearing and said element substantially at the center of said element, whereby misalignment of said lead screws will not cause binding, and whereby the said thrust is transmitted to said spindle along the axis thereof, and means operative when said power means are in use to cause disengagement of said hand feeding means.

5. In a machine of the class described having a rotatable and feedable spindle, means for locking said spindle against movement axially, comprising a clamping bar extending parallel to said spindle, a pair of clamping members having jaws operatively disposed with respect to said clamping bar and fixed against axial movement with respect to said spindle, and cam means for actuating said clamping members.

6. In a machine of the class described having a rotatable and feedable spindle, means for locking said spindle against movement axially, comprising a clamping bar extending parallel to said spindle, a pair of clamping members having jaws operatively disposed with respect to said clamping bar and fixed against axial movement with respect to said spindle, cam means for actuating said clamping members, and means carried by the spindle with which the clamping members are connected, said means having grippers thereon which lie between the jaws and the clamping bar.

7. In a machine of the class described having a rotatable and feedable spindle, means for locking said spindle against movement axially, comprising a clamping bar extending parallel to said spindle, a pair of clamping members having jaws operatively disposed with respect to said clamping bar, a grooved element moving axially with the spindle, said clamping members being engaged in the grooves thereof so that their position axially of said spindle is fixed, and cam means for actuating said clamping members.

8. In a machine of the class described having a rotatable and feedable spindle, means for locking said spindle against movement axially, comprising a clamping bar extending parallel to said spindle, a pair of clamping members having jaws operatively disposed with respect to said clamping bar, a grooved element moving axially with the spindle, said clamping members being engaged in the grooves thereof so that their position axially of said spindle is fixed, and cam means for actuating said clamping members, said grooved element having grippers thereon, lying between the jaws and the clamping bar.

9. In a machine of the class described having a rotatable and feedable spindle, means for locking said spindle against movement axially, comprising a clamping bar extending parallel to said spindle, a pair of clamping members having jaws operatively disposed with respect to said clamping bar, a grooved element moving axially with said spindle, said clamping members being engaged in the grooves thereof so that their position axially of said spindle is fixed, a spline shaft parallel to said spindle, said cam means being mounted on said spline shaft for movement therealong with said spindle and means for rocking said spline shaft.

10. In a machine of the class described having a rotatable and feedable spindle, means for locking said spindle against movement axially, comprising a clamping bar extending parallel to said spindle, a pair of clamping members having jaws operatively disposed with respect to said clamping bar, a grooved element moving axially with said spindle, said clamping members being engaged in the grooves thereof so that their position axially of said spindle is fixed, a spline shaft parallel to said spindle, said cam means being mounted on said spline shaft for movement therealong with said spindle and means for rocking said spline shaft, the grooved element having grippers thereon lying between the jaws and the clamping bar.

11. In a machine tool having a rotatable spindle, means of feeding said spindle comprising a pair of lead screws on diametrical opposite sides of said spindle, nuts on said lead screws, a connecting member adapted to engage said nuts, said connecting member being arranged to feed the spindle axially.

12. In a machine tool having a rotatable spindle, means of feeding said spindle comprising a pair of lead screws on diametrical opposite sides of said spindle, nuts on said lead screws, a connecting member adapted to engage said nuts, and to restrain rotation thereof, said connecting member being arranged to feed the spindle axially.

13. In a machine tool having a rotatable spindle, means of feeding said spindle comprising a pair of lead screws on diametrical opposite sides of said spindle, nuts on said lead screws, a connecting member adapted to engage said nuts, said connecting member being arranged to feed the spindle axially, said screws being restrained axially at both ends.

14. In a machine tool having a rotatable spindle, means of feeding said spindle comprising a pair of lead screws on diametrical opposite sides of said spindle, nuts on said lead screws, a connecting member adapted to engage said nuts, and to restrain rotation thereof, said connecting member being arranged to feed the spindle axially, said screws being restrained axially at both ends.

15. In a machine tool having a rotatable spindle, means for feeding said spindle axially including a member rotatably connected with the spindle, but fixedly connected axially thereof, whereby movement of the member moves the spindle axially, and clamping means for clamping the spindle in fixed position axially comprising clamping members fulcrumed on said member, a clamping bar, said member having gripper faces to engage the clamping bar, and the clamping members having jaws to engage the gripping members and force them against the clamping bar.

16. In a machine tool having a rotatable spindle, means for feeding the spindle axially comprising a thrust bearing element located to engage the inner end of the spindle, means for feeding said spindle in a direction axially of the spindle, a clamping bar parallel with the spindle, gripping members on the bearing member to engage the clamping bar, and clamping jaws fulcrumed on the bearing and arranged to engage the gripping members and force them against the clamping bar.

17. In a machine tool having a spindle, means for feeding the spindle axially comprising a thrust bearing element located to engage the spindle and feed it along axially, a clamping bar parallel to the spindle, jaws on the bearing element which lie along the sides of said clamping bar, and means carried by the bearing element and having members for engaging said jaws and forcing them against the clamping bar to lock the spindle against movement.

JOHN M. WALTER.